(12) United States Patent
Kumar et al.

(10) Patent No.: US 6,478,084 B1
(45) Date of Patent: Nov. 12, 2002

(54) ENERGY SAVING THERMOSTAT WITH A VARIABLE DEADBAND

(75) Inventors: Pawan Kumar, 57 Center Ave. Ext. Apt. #B, Norwalk, CT (US) 06851; Ravi Gorthala, 753 Classon Ave. #7F, Brooklyn, NY (US) 11238

(73) Assignees: Steven Winter Associates, Inc., Norwalk, CT (US); Pawan Kumar, Norwalk, CT (US); Ravi Gorthala, Asheville, NC (US)

( * ) Notice: Subject to any disclaimer, the term of this patent is extended or adjusted under 35 U.S.C. 154(b) by 0 days.

(21) Appl. No.: 09/295,380

(22) Filed: Apr. 21, 1999

Related U.S. Application Data

(60) Provisional application No. 60/082,873, filed on Apr. 24, 1998.

(51) Int. Cl.⁷ .......................... F24F 11/00; G05D 23/00
(52) U.S. Cl. ................... 165/255; 165/238; 165/291; 236/46 R
(58) Field of Search ................. 165/238, 239, 165/255, 291; 236/46 R, 47, 1 C, 1 EA, 46 F, DIG. 14; 62/231

(56) References Cited

U.S. PATENT DOCUMENTS

| | | | |
|---|---|---|---|
| 3,973,618 A | * 8/1976 | Naley et al. ............. 165/255 X |
| 3,983,928 A | * 10/1976 | Barnes ...................... 236/47 X |
| 4,102,495 A | * 7/1978 | Flynn et al. ............... 236/46 R |
| 4,153,936 A | 5/1979 | Schmitz et al. ............. 364/493 |
| 4,177,860 A | * 12/1979 | Johnson et al. .......... 236/1 C X |
| 4,186,874 A | * 2/1980 | Jensen ...................... 236/46 R |
| 4,252,270 A | * 2/1981 | Taylor et al. .................. 236/47 |
| 4,292,813 A | * 10/1981 | Paddock ................ 236/46 F X |
| 4,323,112 A | * 4/1982 | Nordeen ................ 236/1 C X |
| 4,325,427 A | * 4/1982 | Bramow et al. ............. 165/253 |
| 4,354,241 A | 10/1982 | Barello ....................... 364/492 |
| 4,356,961 A | * 11/1982 | Smith ....................... 236/1 EA |
| 4,356,963 A | * 11/1982 | Levine ................. 236/46 F X |
| 4,386,649 A | * 6/1983 | Hines et al. .......... 236/46 R X |
| 4,388,692 A | * 6/1983 | Jones et al. .............. 165/238 X |
| 4,446,913 A | * 5/1984 | Krocker ................... 165/255 X |
| 4,453,590 A | * 6/1984 | Holliday et al. ........... 62/231 X |
| 4,460,123 A | 7/1984 | Beverly ...................... 236/46 R |
| 4,473,183 A | * 9/1984 | Kensinger et al. ......... 236/46 R |
| 4,504,010 A | * 3/1985 | Sukimoto et al. .......... 236/46 F |
| 4,557,317 A | * 12/1985 | Harmon, Jr. ........... 236/46 R X |
| 4,634,046 A | * 1/1987 | Tanaka ...................... 62/231 X |
| 4,641,013 A | * 2/1987 | Dunnigan et al. ......... 236/47 X |
| 4,682,279 A | * 7/1987 | Watabe .................... 165/238 X |
| 4,687,050 A | * 8/1987 | Podlipnik ............... 236/1 C X |
| 4,706,882 A | * 11/1987 | Barnard .................. 165/239 X |
| 4,725,001 A | 2/1988 | Carney et al. ................. 236/11 |
| 4,751,961 A | * 6/1988 | Levine et al. ............. 236/47 X |
| 4,837,731 A | * 6/1989 | Levine et al. ............ 165/238 X |
| 4,841,738 A | * 6/1989 | Katsuki et al. ........ 236/46 R X |
| 4,901,917 A | * 2/1990 | Littell, III ............... 165/239 X |
| 4,967,382 A | * 10/1990 | Hall ....................... 236/46 R X |
| 5,038,851 A | * 8/1991 | Mehta .................... 236/1 C X |
| 5,192,020 A | * 3/1993 | Shah ....................... 165/238 X |
| 5,326,026 A | * 7/1994 | Jefferson et al. ....... 236/46 F X |
| 5,329,991 A | * 7/1994 | Mehta et al. ................. 165/238 |
| 5,355,938 A | * 10/1994 | Hosoya et al. ........ 236/464 F X |
| 5,361,983 A | * 11/1994 | Bird ....................... 165/239 X |
| 5,395,042 A | * 3/1995 | Riley et al. ............... 236/47 X |
| 5,560,422 A | * 10/1996 | Matumoto et al. .... 236/46 R X |
| 5,924,486 A | * 7/1999 | Ehlers et al. .......... 236/46 R X |
| 6,079,121 A | * 6/2000 | Khadkikar et al. ....... 236/47 X |

* cited by examiner

*Primary Examiner*—Ljiljana Ciric
(74) *Attorney, Agent, or Firm*—Crowell & Moring LLP

(57) ABSTRACT

An apparatus for, and a method of, reducing cycling of heating and cooling systems by varying the deadband of a thermostat. The deadband is varied such that it does not impact human comfort significantly. The deadband is kept narrow (at its current normal value) during peak heating/cooling period, while it is made wider during periods of non-occupancy, shoulder months with low heating/cooling requirements, and set-back periods. The variation of deadband can be based on an internal clock/calender, an outdoor temperature sensor or a combination of both. The apparatus may be an electronic thermostat which may be programmable.

22 Claims, 4 Drawing Sheets

Note:

DB = Deadband

VDB = Variable deadband

NDB = Normal deadband

Note:
$T_{out}$ = Outdoor temperature
DB = Deadband
VDB = Variable deadband
NDB = Normal deadband

ENERGY SAVING THERMOSTAT WITH A VARIABLE DEADBAND

This application claims the priority of provisional application Ser. No. 60/082,873, filed Apr. 24, 1998, the disclosure of which is expressly incorporated by reference herein.

BACKGROUND AND SUMMARY OF THE INVENTION

This invention relates to a method and an apparatus for controlling heating and cooling systems for buildings. Thermostats are typically used to maintain space temperatures in buildings by controlling heating and cooling systems. This invention is more specifically related to such thermostats.

Known thermostats turn the heating and cooling system on or off whenever the space temperature deviates from the thermostat set-point temperature. When the set-point temperature is not met, the thermostat turns the heating and cooling system on and when the set-point temperature is met, it turns the system off. The limits of deviation from the set-point temperature (when the system is turned on and when the system is turned off) are known as the deadband of the thermostat. Current thermostats operate with a constant deadband, which is usually narrow. Since the single-speed heating and cooling system is normally designed for peak heating/cooling loads, it cycles on and off more frequently, when the outdoor temperatures are mild. This increased cycling decreases the system performance. Therefore, the present invention relates to a method and an apparatus that uses a variable deadband rather than a fixed deadband to decrease cycling of the single-speed heating and cooling system and to increase its energy efficiency without sacrificing comfort.

Residential heating and cooling systems operate at fixed speeds. Since the weather variation poses varying load on the building and the capacity of the heating and cooling system is constant, the system cycles to meet the building load. It is well known that cycling of heating and cooling systems results in as much as 40% of energy waste depending upon the climate and amount of over-sizing of the systems. A perfect solution to this problem is to utilize continuously variable speed heating and cooling systems that vary the capacity to meet the varying load. There have been attempts to introduce continuously variable speed systems into the residential market. However, these attempts have not been successful due to high cost and complexity of the variable speed systems.

Rather than attempting to eliminate cycling completely with expensive variable speed HVAC systems, the present invention reduces cycling in an inexpensive and practical way. The present invention achieves reduced cycling by implementing simple strategies in the existing thermostat technologies. The present invention is applicable to both electronic (programmable) and electromechanical thermostats.

A primary object of the invention is to provide a method which reduces cycling of heating and cooling systems used to condition buildings. Another object of the invention is to implement such a reduced cycling method into an electronic thermostat. Another object of the invention is to implement such a reduced cycling method into an electromechanical thermostat.

The present invention uses a variable deadband rather than a fixed deadband for the thermostat to control any space heating and cooling system. The deadband is kept constant and narrow during peak heating/cooling periods. The deadband is made wider when the outdoor temperatures are milder. Also, when the thermostat is set back during night or during periods of non-occupancy, the deadband is set wider. By increasing the deadband, the system cycling is reduced and its efficiency is increased.

It is to be clearly understood that the term "wider deadband" is used herein to signify a wider deadband vis-a-vis a normal, relatively narrow deadband. Therefore, in its simplest form, the instant invention may utilize a dual deadband, for example in the case where the "wider deadband" is factory-set and fixed. However, the "wider deadband" may be variable according to certain preferred embodiments, i.e. the width of the "wider deadband" may be adjustable, to provide a "variable deadband" in order to obtain further adjustability and control over the cycling times of the HVAC system. The width of the "variable deadband" may be varied, for example, via direct input from a user, or alternatively as a function of time and/or temperature.

According to certain preferred embodiments, a separate fixed "normal" deadband may be eliminated entirely where the width of the variable deadband is itself variable. In this embodiment, the variable deadband may be adjusted continuously or step-wise, for example as a function of a time schedule and/or the outdoor temperature. Such an embodiment allows greater adjustability and more precise control than, for example, a variable deadband thermostat with only a dual deadband.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
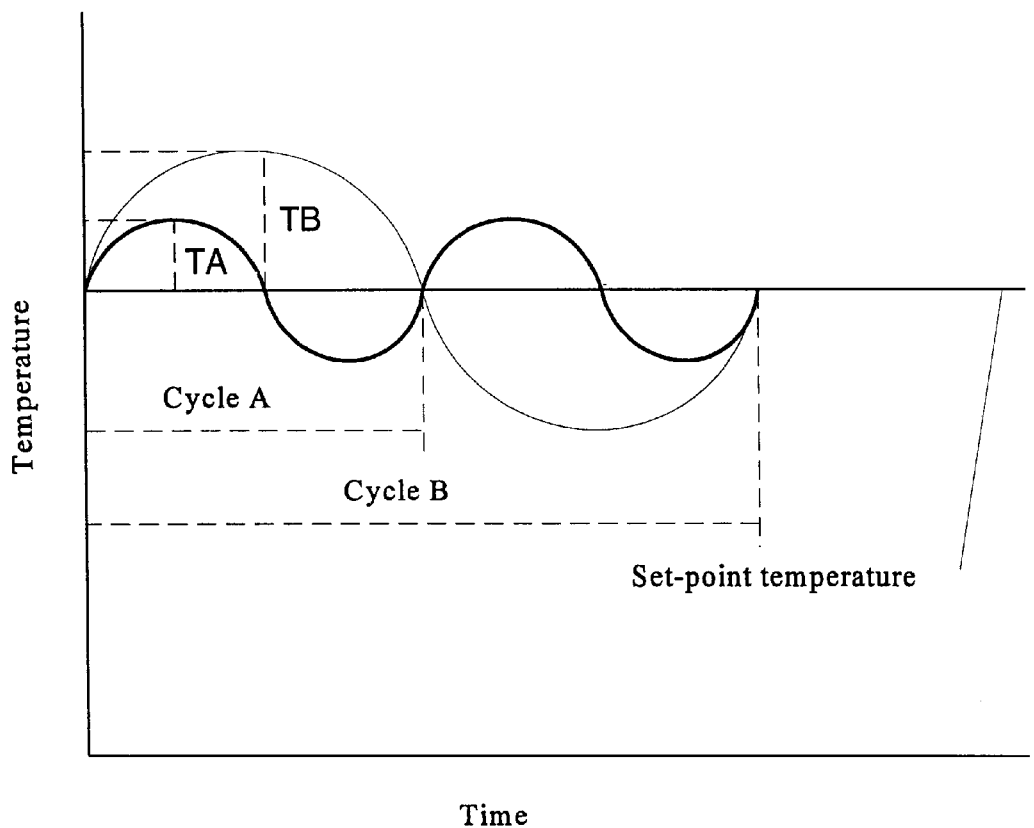
FIG. 1 schematically shows deadband and cycling.

FIG. 1 presents an illustration showing the relationship between deadband and cycling for two thermostats A and B. Note that FIG. 1 is only a schematic for illustration and is not to scale. The deadband is the deviation of room air temperature from the set-point temperature. The deadband may also be referred to as the throttling range. The deadbands are ±TA and ±TB for the thermostats A and B, respectively. As shown in FIG. 1, thermostat A with the narrower deadband has higher cycling rate (2 cycles) than thermostat B with the wider deadband (1 cycle). If the deadband is increased further, the cycling can be reduced even further.

Current thermostats have a deadband of about ±1° F. or lower. The focus of current thermostats is on comfort, i.e., maintaining the set point temperature as close as possible, which increases cycling. However, the issue of comfort is broad and varied. There is no unique temperature setting that will satisfy every human being. Comfort conditions are not stipulated by the room air temperature alone. Comfort depends on several variables: mean radiant temperature, clothing, activity level, air velocity, and relative humidity. Depending upon these variables, there is a range of air temperatures that can be comfortable. Considering these issues, the present invention varies the deadband such that it does not impact comfort significantly. Also, the occupant has control over changing the deadband.

The basis for this concept of varying the deadband is that comfort requirements are not the same throughout the year (heating and cooling periods). For instance, during the heating season, if the outdoor temperature changes from 30° F. or below to 40° F. or above, the mean radiant temperature in a room will increase significantly. This increase in room mean radiant temperature will provide comfort conditions even at lower room air temperatures. Therefore, increasing the deadband and deviating from the room air temperature below the set point temperature, does not impair comfort conditions drastically. According to the present invention, there are periods where the deadband will be kept constant and at the minimum level (normal deadband) when the outdoor temperatures are near the peak/valley. When the outdoor temperatures are mild and the mean radiant temperatures are moderate, a wider deadband will be used. Also, the wider deadband may be used during setback periods or periods of non-occupancy, even when the outdoor temperatures are near the peak/valley. The variable deadband thermostat has the following features.

The user has a choice to select a fixed deadband or a variable deadband feature. If a variable deadband is selected, the user is able to set the deadband (magnitude such as ±3° F.) or a default deadband is set. Multiple magnitudes for the deadband can be used.

According to certain preferred embodiments, a programmable thermostat varies the deadband based on an internal clock or an outdoor temperature sensor or a combination of both.

The deadband may be controlled based on a clock. Time periods during which the thermostat should operate with a variable deadband are set in the programmable thermostat. For example, these time periods could be shoulder months, when the requirement for heating or cooling is lower compared to peak heating/cooling (for example in a climate such as Washington, DC: April through May for heating; September through October for cooling). Also, a variable deadband may be used whenever the thermostat is in setback mode during the night. The deadband is programmable as a function of time.

Figure 2:
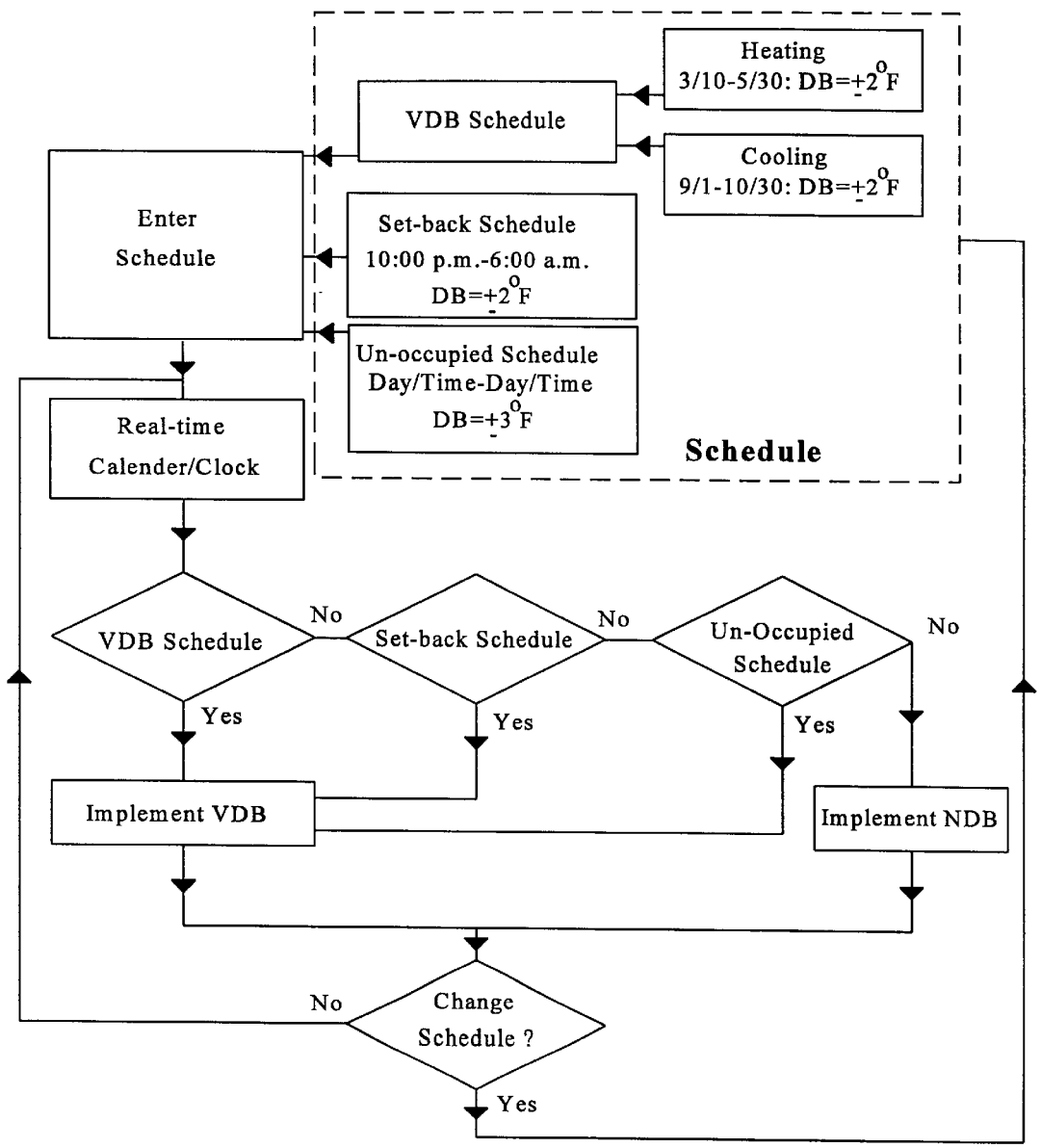
FIG. 2 schematically shows control of a thermostat with variable deadband based on a time schedule, according to a preferred embodiment of the present invention.

A flow chart schematically illustrating an example of a modification of a conventional thermostat to have a variable deadband based on internal clock is shown in FIG. 2. As shown in FIG. 2, first a schedule for variable deadband, set-back, and non-occupancy may be entered. This schedule may be set at the factory and may be varied by the user. Then, the thermostat compares the schedule with an internal clock's time. If it is time to implement the variable deadband schedule, it will change the deadband. If not, it will keep the normal deadband in operation. The user has a choice to change the schedule any time. FIG. 2 shows variable deadbands of ±2° F. and ±3° F., specified months and time periods for schedule implementation. These are for illustrative purposes only. These could vary depending upon the climate and the user's choice.

The deadband may be controlled based on an outdoor temperature sensor, varying the deadband as a function of outdoor temperature. When the outdoor temperature is near the peak/valley, the deadband will be narrow (which is currently used). When the outdoor temperature deviates from the specified value, the deadband may be varied. This variation can be easily programmed into a thermostat with a feature to read an outdoor temperature sensor.

Figure 3:
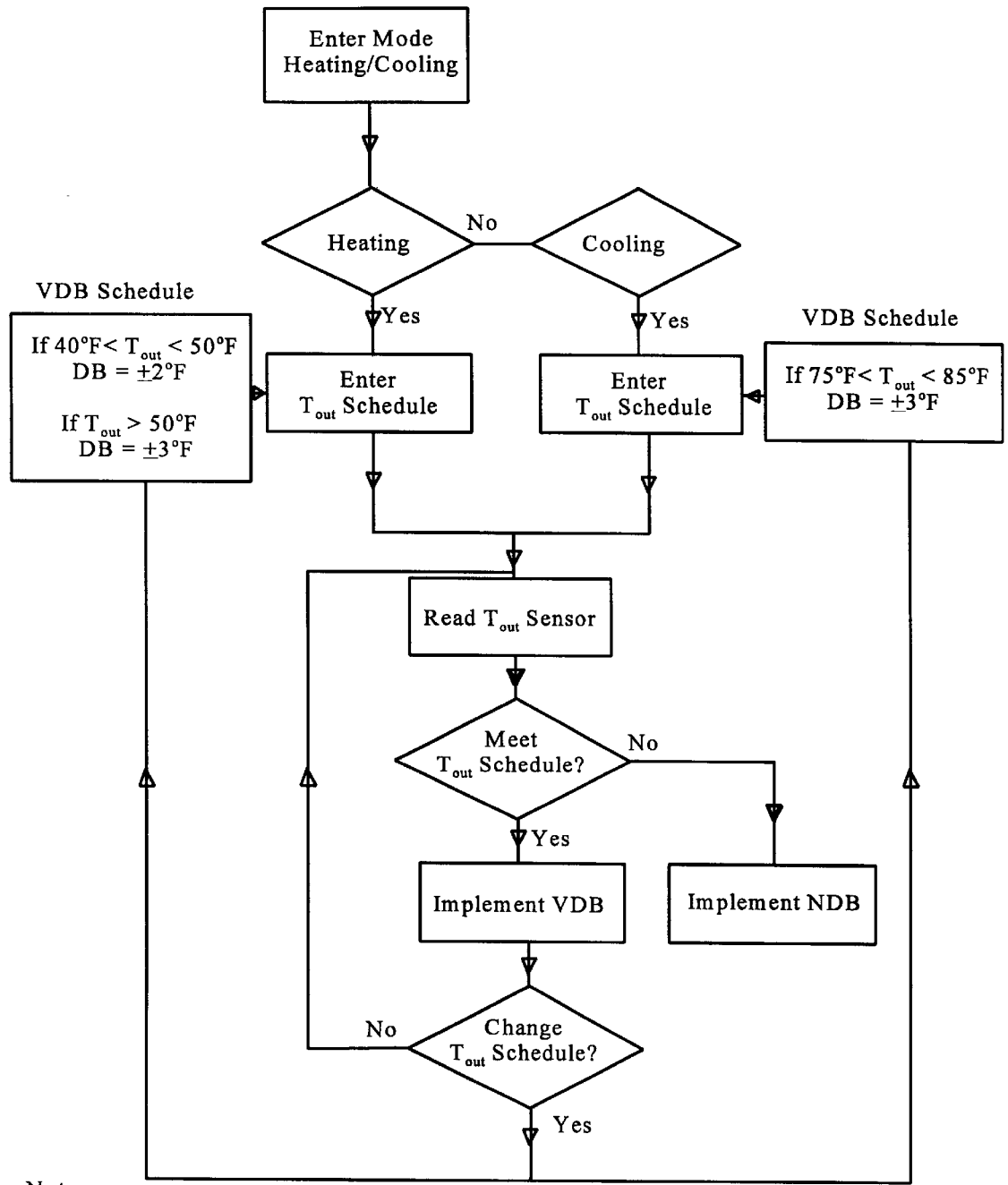
FIG. 3 schematically shows control of a thermostat with variable deadband based on an outdoor temperature sensor, according to a preferred embodiment of the present invention.

A flow chart schematically illustrating an example of a modification of a conventional thermostat to have a variable deadband based on outdoor temperature is shown in FIG. 3. As shown in FIG. 3, one first selects the mode (heating or cooling). For each of the modes, a range of outdoor temperatures ($T_{out}$) is specified for implementing a variable deadband. When the outdoor temperature read by the temperature sensor falls within the variable deadband schedule, the normal deadband will be changed to the variable deadband. Otherwise, the normal deadband will be maintained. Here again, the range for $T_{out}$ and the magnitudes for the deadband are for illustrative purpose only. These may be set by the manufacturer and by the user.

A combination thermostat may use both an internal clock schedule and an outdoor temperature sensor. For instance, this thermostat may implement the variable deadband primarily by an outdoor temperature sensor and a schedule. Also, this primary schedule based on outdoor temperature can be augmented by the set-back and/or non-occupancy schedule, which are clock-based.

Figure 4:
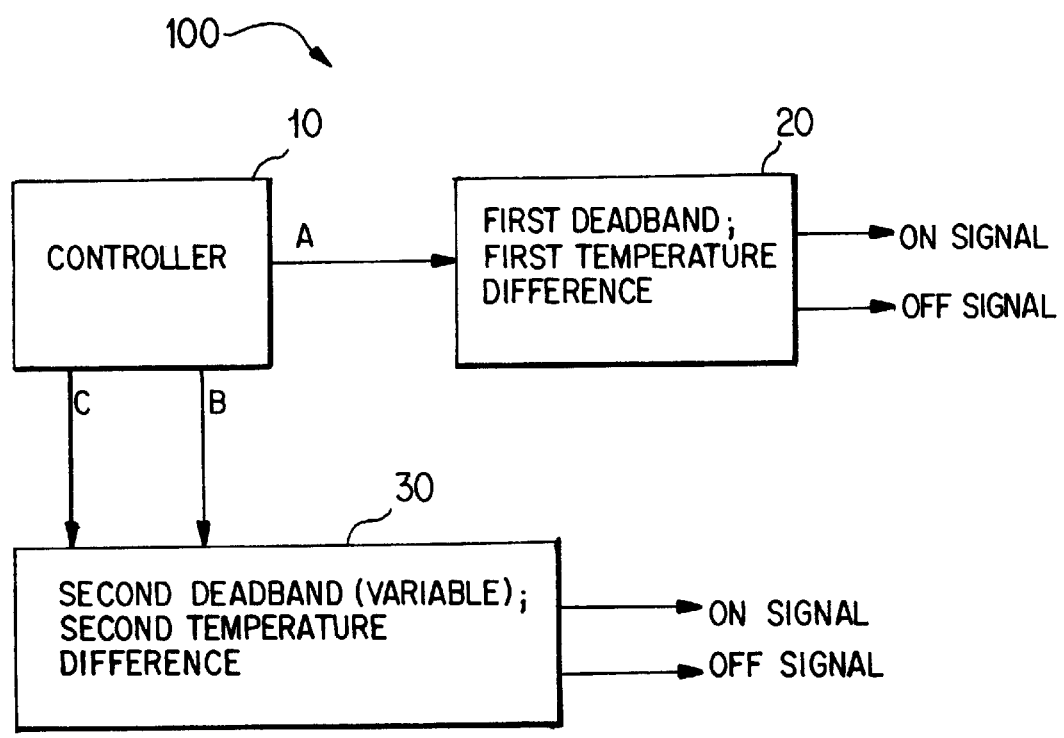
FIG. 4 is a schematic illustrating the control on a thermostat between two different deadbands.

FIG. 4 shows the structure whereby a thermostat (100) has a controller (10) for switching between the operation for a first deadband temperature difference (20) and a second deadband temperature difference (30) where each of 20 and 30 provide an on signal and when the respective differences have been reached. Output Layer Controller (10) operates the first deadband (20) while Output B switches to the second deadband. The output of Controller C functions to change the temperature difference in the second deadband in order to operate as the "variable deadband".

An add-on electronic kit that can alter the deadband of an electromechanical thermostat (or a bi-metal thermostat) is extremely useful for retrofit application of existing bi-metal thermostats. The add-on kit will primarily alter the deadband of the electromechanical thermostat according to a clock or an outdoor temperature sensor. One of the practical ways to change the deadband of an electromechanical thermostat is to heat or cool the temperature sensor present in the thermostat. This can be accomplished by a resistance heater and/or a thermoelectric heat pump module.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and. equivalents thereof.

What is claimed is:

1. A method for controlling a thermostat, comprising the steps of:
   providing the thermostat with a first deadband;
   providing the thermostat with a second deadband which is wider than said first deadband; and
   switching the thermostat between the first deadband and said second deadband, wherein said thermostat is switched to said first deadband during peak heating periods and peak cooling periods.

2. A method according to claim 1, wherein said thermostat is switched to said second deadband during at least one of: (a) periods of non-occupancy, (b) shoulder months with low heating and cooling requirements, and (c) set-back periods.

3. A method according to claim 1, wherein said second, deadband is variable.

4. A method according to claim 1, wherein said switching step is controlled based on a time-based schedule.

5. A method according to claim 4, wherein said time-based schedule is programmable via user input.

6. A method according to claim 1, wherein said switching step is controlled as a function of an outdoor temperature.

7. A method for controlling a thermostat, comprising the steps of:

providing the thermostat with a variable deadband; and varying the variable deadband based on at least one of (a) a predetermined condition, and (b) a sensed condition, wherein said variable deadband is decreased in width during peak heating periods and peak cooling periods.

8. A method according to claim 7, wherein said deadband is increased during at least one of: (a) periods of non-occupancy, (b) shoulder months with low heating and cooling requirements, and (c) set-back periods.

9. A method according to claim 7, wherein said predetermined condition is a time-based schedule.

10. A method according to claim 9, wherein said time-based is programmable via user input.

11. A method according to claim 7; wherein said sensed condition is an outdoor temperature.

12. A thermostat for providing a first on-state signal at a first temperature and a second off-state signal at a second temperature, said thermostat comprising:

a first setting device for setting the difference between the first temperature and the second temperature to a first deadband value;

a second setting device for setting the difference between the first temperature and the second temperature to a second deadband value greater than the first deadband value; and a control device for selectively switching between said first and second setting device, wherein said control device switches to said first setting device during peak heating periods and peak cooling periods.

13. A thermostat according to claim 12, wherein said control switches to said second setting device during at least one of: (a) periods of non-occupancy of a building, (b) months with low heating and cooling requirements, and (c) set-back periods.

14. A thermostat according to claim 12, wherein said second deadband value is variable.

15. A thermostat according to claim 12, wherein said control switches between said first setting device and said second setting device based on a time-based schedule.

16. A thermostat according to claim 15, wherein said time-based schedule is programmable via user input.

17. A thermostat according to claim 12 wherein said control switches the thermostat between said first setting device and said second setting device as a function of a measured outdoor temperature value.

18. A thermostat for providing a first on-state signal at a first temperature and a second off-state signal at second temperature, said thermostat at comprising: a varaiable deadband; and, a control device for varying the difference between said first temperature and said second temperature to form said variable deadband as a function of at least one of: (a) a predetermined condition value and (b) a sensed condition value, wherein said control device decreases said variable deadband value during peak heating periods and peak cooling periods.

19. A thermostat according to claim 18, wherein said control increases said deadband value during at least one of: periods of non-occupancy of a building, (b) months with low heating and cooling requirements, and (c) set-back periods.

20. A thermostat according to claim 18, wherein said predetermined condition is a time-based schedule.

21. A thermostat according to claim 20, wherein said time-based schedule is programmable via user input.

22. A thermostat according to claim 18, wherein said sensed condition is a measured outdoor temperature.

* * * * *